(12) United States Patent
Ait Bouziad et al.

(10) Patent No.: US 12,440,059 B2
(45) Date of Patent: Oct. 14, 2025

(54) GRINDING AND EXTRACTION APPARATUS FOR COFFEE BEANS

(71) Applicant: SOCIETE DES PRODUITS NESTLE S.A., Vevey (CH)

(72) Inventors: Youcef Ait Bouziad, Echandens (CH); Alfred Yoakim, St-Legier-la Chiesaz (CH)

(73) Assignee: Société des Produits Nestlé S.A., Vevey (CH)

( * ) Notice: Subject to any disclaimer, the term of this patent is extended or adjusted under 35 U.S.C. 154(b) by 442 days.

(21) Appl. No.: 18/002,748

(22) PCT Filed: Jun. 4, 2021

(86) PCT No.: PCT/EP2021/065039
§ 371 (c)(1),
(2) Date: Dec. 21, 2022

(87) PCT Pub. No.: WO2021/259616
PCT Pub. Date: Dec. 30, 2021

(65) Prior Publication Data
US 2023/0255394 A1    Aug. 17, 2023

(30) Foreign Application Priority Data
Jun. 24, 2020    (EP) .................................... 20181832

(51) Int. Cl.
*A47J 31/42*    (2006.01)
*A23F 5/08*    (2006.01)
(Continued)

(52) U.S. Cl.
CPC ................. *A47J 31/42* (2013.01); *A23F 5/08* (2013.01); *A23F 5/26* (2013.01); *A47J 31/4492* (2013.01); *A47J 31/52* (2013.01)

(58) Field of Classification Search
CPC ........ A47J 31/42; A47J 31/4492; A47J 31/52; A47J 31/402; A47J 31/404; A47J 31/525;
(Continued)

(56) References Cited

U.S. PATENT DOCUMENTS 5,186,399 A  *   2/1993   Knepler .................. A47J 42/38
                                                        241/34
6,238,721 B1 *   5/2001   Knepler .................. A47J 42/38
                                                        426/590
(Continued)

FOREIGN PATENT DOCUMENTS

CN    104159480    11/2014
CN    107427150    12/2017
(Continued)

OTHER PUBLICATIONS

Kuznetsova, "Brackets in the Text of a Legal Document as a Linguocognitive Phenomenon", Journal of MGU. Series: Russian Philology, vol. 03, 2015, pp. 37-43.
(Continued)

*Primary Examiner* — Drew E Becker
(74) *Attorney, Agent, or Firm* — Thorpe North & Western, LLP

(57) ABSTRACT

The invention relates to a grinding and extraction apparatus for roasted coffee beans comprising a grinding device (60) and an associated extraction device (70); the grinding device (60) comprising one or more housings for receiving one or more beans containers (10, 20) with roasted coffee beans of the same or different types; the grinding device (60) comprising a reader (62) to obtain the information of the product parameters of the roasted coffee beans of the one or more beans containers (10, 20); the grinding device (60) further comprising a control unit configured to adapt the grinding
(Continued)

size and the quantity of roasted coffee beans for obtaining a certain coffee blend from each beans container to be grinded according to these product parameters and/or according to a recipes database (64) comprising the beverage information associated to the beverage to be prepared; the grinding device (60) further comprising an encoder (62) to encode the beverage information on programmable identification means (65) on a product holder (61) in the grinding device (60), to where the grinded coffee is sent; the extraction device (70) being configured for receiving the product holder (61) and comprising reading means (72) to identify the beverage information in the said product holder identification means (65), the extraction device (70) further comprising a control unit to extract the beverage according to the beverage information retrieved and/or from the beverage information retrieved from a beverage database in this control unit. Moreover, the invention relates to a method for grinding roasted coffee beans and preparing a beverage from them using a grinding and extraction apparatus as the one described, and also refers to the use of a grinding and extraction apparatus as the one described for delivering a certain beverage from roasted coffee beans.

11 Claims, 20 Drawing Sheets

(51) Int. Cl.
    *A23F 5/26* (2006.01)
    *A47J 31/44* (2006.01)
    *A47J 31/52* (2006.01)

(58) Field of Classification Search
    CPC ... A47J 42/40; A47J 42/52; A23F 5/08; A23F 5/26
    See application file for complete search history.

(56) References Cited

U.S. PATENT DOCUMENTS

| | | | | |
|---|---|---|---|---|
| 8,306,655 | B2* | 11/2012 | Newman | B67D 1/0882 |
| | | | | 700/239 |
| 11,259,557 | B2* | 3/2022 | Perentes | A47J 31/42 |
| 2003/0129286 | A1* | 7/2003 | Knepler | A47J 31/525 |
| | | | | 426/231 |
| 2011/0094391 | A1* | 4/2011 | Erba | A47J 42/40 |
| | | | | 99/317 |
| 2012/0097040 | A1* | 4/2012 | Levi | A47J 31/0663 |
| | | | | 99/285 |
| 2013/0082130 | A1 | 4/2013 | Hulett et al. | |
| 2014/0314921 | A1 | 10/2014 | Kuempel et al. | |
| 2015/0135962 | A1* | 5/2015 | Jarisch | G11C 7/1006 |
| | | | | 235/492 |
| 2015/0351581 | A1 | 12/2015 | Li et al. | |
| 2016/0143481 | A1 | 5/2016 | Merelli | |
| 2016/0174590 | A1 | 6/2016 | Boggavarapu | |
| 2016/0338525 | A1* | 11/2016 | Fain | A47J 31/002 |
| 2018/0000108 | A1 | 1/2018 | Boggavarapu | |
| 2018/0055288 | A1* | 3/2018 | Rose | A47J 42/40 |
| 2018/0325307 | A1* | 11/2018 | Stasch | A47J 31/5255 |
| 2019/0082881 | A1* | 3/2019 | Steber | A47J 31/4403 |
| 2019/0231146 | A1* | 8/2019 | Dubief | A47J 42/52 |
| 2020/0133890 | A1* | 4/2020 | Zehnder | G06F 13/4282 |
| 2020/0196793 | A1* | 6/2020 | Ninomiya | B67D 7/34 |
| 2021/0127891 | A1* | 5/2021 | Wei | A47J 31/3623 |
| 2021/0386245 | A1* | 12/2021 | Dayton | G06Q 10/06315 |
| 2024/0008675 | A1* | 1/2024 | Torizu | A47J 31/525 |
| 2024/0197106 | A1* | 6/2024 | Carlins | A47J 31/4403 |
| 2025/0221563 | A1* | 7/2025 | Perentes | A47J 31/4492 |

FOREIGN PATENT DOCUMENTS

| | | |
|---|---|---|
| CN | 109480313 | 3/2019 |
| CN | 109788873 | 5/2019 |
| CN | 111265115 | 6/2020 |
| CN | 115697143 | 2/2023 |
| CN | 115697147 | 2/2023 |
| CN | 115697148 | 2/2023 |
| EP | 1700549 A1 | 9/2006 |
| EP | 2314188 | 4/2011 |
| JP | 2002360170 | 12/2002 |
| KR | 20190069397 A | 6/2019 |
| RU | 190351 U1 | 6/2019 |
| WO | 2016075147 A1 | 5/2016 |
| WO | 2018021081 | 2/2018 |

OTHER PUBLICATIONS

Japanese Office Action for Appl No. 2022-575429 dated Sep. 10, 2024, 3 pages.

\* cited by examiner

GRINDING AND EXTRACTION APPARATUS FOR COFFEE BEANS

CROSS REFERENCE TO RELATED APPLICATIONS

The present application is a National Stage of International Application No. PCT/EP2021/065039, filed on Jun. 4, 2021, which claims priority to European Patent Application No. 20181832.5, filed on Jun. 24, 2020, the entire contents of which are being incorporated herein by reference.

1. FIELD OF THE INVENTION

The present invention relates to an apparatus for grinding coffee beans and for extracting a beverage from said grinded coffee, and to an associated method for grinding and extracting a beverage.

2. TECHNICAL BACKGROUND

In all domains of food and beverage preparation, the quality of the prepared food or beverage requires, at least: adequate quality of the raw product; right tools (machines, devices, etc.) and knowledge and skills to ensure the right preparation processes.

Hot beverage preparation, more particularly coffee preparation and its derivates, also obey the same rules.

Since the very first invention of a coffee extraction machine, the associated techniques have heavily evolved during the last decades. It is known in the state of the art that the first machine for making espresso was built and patented in 1884 by Angelo Moriondo of Turin, Italy. An improved design was later patented on Apr. 28, 1903, by Luigi Bezzera. The founder of the La Pavoni company bought the patent and from 1905 produced espresso machines commercially on a small scale in Milan. Multiple machine designs have been created to produce espresso. Several machines share some common elements, such as a group head and a portafilter. An espresso machine may also have a steam wand which is used to steam and froth liquids (such as milk) for coffee drinks such as cappuccino and caffè latte.

Fully Automatic machines using roasted beans to prepare a coffee beverage are widely known in the state of the art. In the 80's fully automated machines of diverse brands (Jura, Saeco, etc.) have followed the trend of automation. Consequently, they have grouped all the functions done by a Barista (skilled person preparing coffee beverages) in a single machine, including grinding of coffee beans, dosing, tamping, as well as extraction of the coffee beverage. As a consequence, in these machines, the operator only needs to fill the bean hopper and, if the machine is not connected to a water line, add water to a reservoir. The rest is automatically done by the machine itself.

Fully Automatic machines are growing in the market as they simplify the extraction steps and can be used by a non-skilled person. However, they are bulky and complex, and more importantly, they are considered to be a compromise between preparation quality and convenience.

Fully automatic machines take away the ability to manually tamping and grinding the coffee, which may affect the quality of the espresso, as this setting cannot be changed from a beverage to another.

Typically, the grinder can be adjustable to get the right grind size for the desired beverage: however once adjusted, the same grind size is used for all the beverages. And most importantly, the machine is never adjusted by the user according to the different coffee beans used. This results in a compromise of quality and convenience of the final beverage delivered.

The system of the invention comes to solve these limitations, as it will be further explained.

The main object of the present invention is to achieve similar end results of the coffee beverage delivered than those obtained when using a capsule system without the need of using any single serve packaging, and without any specific skills being needed. The invention achieves this by building a system comprising several main-devices that communicate between themselves via accessory-devices, that transfer/communicate the required parameters in order to replace a Barista know-how by an artificial intelligence (AI) system.

The system of the invention adjusts the parameters of each main-device (the inputs), according to the outputs of the main-device used in the previous phase. The goal is to ensure the integrity of the procedure and the information by communicating the right parameters to be used.

Fully automatic beverage preparation machines are known in the state of the art and are widely used for preparing coffee beverages. These automatic machines provide a fully automatic process, starting with storing the roasted coffee beans and ending with the delivery of the coffee beverage into a cup. Differently to a fully automated machine, the system of the invention allows more flexibility by using different accessory-devices, tailored to the right preparation, between the main-devices. Typically, these accessory-devices are devices for espresso, drip coffee, soluble coffee, etc.

Differently to single serve systems (typically those using capsules), the system of the present invention does not use a single packaging for each beverage preparation, but a multipack, and uses accessory-devices for extraction/processing.

These and other objects, which become apparent upon reading the following description, are solved by the subject matter of the independent claim. The dependent claims refer to preferred embodiments of the invention.

These and other objects, which become apparent upon reading the following description, are solved by the subject matter of the independent claim. The dependent claims refer to preferred embodiments of the invention.

3. SUMMARY OF THE INVENTION

According to a first aspect, the invention relates to a grinding and extraction apparatus for roasted coffee beans comprising a grinding device and an associated extraction device. The grinding device comprises one or more housings for receiving one or more beans containers with roasted coffee beans of the same or different types: the grinding device comprises a reader to obtain the information of the product parameters of the roasted coffee beans of the one or more beans containers and it further comprises a control unit configured to adapt the grinding size and the quantity of roasted coffee beans for obtaining a certain coffee blend from each beans container to be grinded according to these product parameters and/or according to a recipes database comprising the beverage information associated to the beverage to be prepared. The grinding device of the invention further comprises an encoder to encode the beverage information on programmable identification means on a product holder in the grinding device, to where the grinded coffee is sent. The extraction device is configured for receiving the product holder and comprises reading means to identify the beverage information in the said product holder identification means, the extraction device further comprising a control unit to extract the beverage according to the beverage information retrieved and/or from the beverage information retrieved from a beverage database in this control unit.

Preferably, in the grinding and extraction apparatus for roasted coffee beans of the invention, the beverage information comprises one or a plurality of the following data: beverage type, beverage volume, brewing temperature and/or brewing pump profile, brewing profile according to time.

In the apparatus of the invention, typically, the characteristics of the coffee beans are one or a plurality of the following: coffee beans type, coffee beans origin, batch volume, recommended roasting level or levels, date of harvest, date of production, production data, farmer data, date of expiration, company and or marketing info.

According to a preferred embodiment, the product holder in the grinding and extraction apparatus of the invention comprises plugging means to be quickly plugged and/or unplugged onto the grinding device and onto the extraction device so it is freely exchangeable (plug & play).

Preferably, the product holder in the apparatus of the invention is locked on the grinding device and on the extraction device to allow firm fix of it during the grinding and the extraction operations, respectively.

Typically, the coffee beans received by the grinding device comprise identification means with the characteristics of these roasted coffee beans, to be read by the reading means in the grinding device, these identification means being optical, such as a barcode, OID and/or a QR code, and/or electromagnetically read identification means such as a RFID tag.

In the apparatus of the invention, preferably, the quantity of coffee to be grinded, the grinding size and the blend in the grinding device are adapted as a function of the type of beverage to be prepared from the roasted and grinded coffee beans in combination of the product parameters of the roasted coffee beans of the one or plurality of beans containers connected to the grinding device.

Typically, the one or plurality of coffee beans containers have an embedded dosing device to dose only the needed quantity of roasted coffee beans in the grinding device.

In the grinding and extraction apparatus for roasted coffee beans of the invention, typically, the grinding device comprises a motor and a drive to control the embedded dosing device of the one or plurality of coffee beans containers to dose only the needed dose of roasted coffee beans to the grinding device.

According to a preferred embodiment of the invention, the grinding device comprises a RFID tag reader to obtain the information of the product parameters of the roasted coffee beans of the one or more beans containers connected to it.

According to a second aspect, the invention further relates to a method for grinding roasted coffee beans and preparing a beverage from them using a grinding and extraction apparatus as described. The method of the invention comprises the following steps:
  reading the product parameters in the coffee beans containers;
  adapting the grinding size according to the product parameters read and/or according to a recipes database;
  dispensing a certain quantity of roasted coffee beans from a beans container in the grinding device;
  carrying out the grinding as to grinding size and quantity according to the product parameters read and/or according to a recipes database;
  encoding the beverage information on the product holder in the grinding device;
  transferring the product holder to the extraction device manually or automatically;
  reading the beverage information from the product holder by the extraction device and extracting the beverage according to the beverage information retrieved and/or from the beverage information retrieved from a beverage database.

Preferably, in the method of the invention, where a certain coffee blend is produced in the grinding device and is put in the product holder, the method comprises the following further steps:
  attaching a plurality of coffee beans containers into the grinding device;
  reading the product parameters in each of the plurality of the coffee beans containers;
  carrying out the grinding as to grinding size and quantity of each of the coffee beans containers according to the product parameters read for each and to the type of beverage to be prepared from the recipes database from the roasted and grinded coffee beans.

Yet according to a third aspect, the invention further relates to the use of a grinding and extraction apparatus as the one described for delivering a certain beverage from roasted coffee beans.

Further features, advantages and objects of the present invention will become apparent for a skilled person when reading the following detailed description of non-limiting embodiments of the present invention, when taken in conjunction with the appended drawings.

4. DESCRIPTION OF A PREFERRED EMBODIMENT

In the following, the invention is described exemplarily with reference to the enclosed figures, in which FIG. 1 is an exemplary functional diagram of a roasting, grinding, extraction system according to an embodiment of the invention.

The main goal of the present invention is to achieve similar end results as the ones achieved with a capsule system without using any single serve packaging, and without specific skills needed. The goal of the invention, as it will be explained in more detail in what follows, is to build main-devices that communicate among them via accessory-devices, that transfer/communicate parameters in order to replace the Barista (skilled person) know-how by an AI (Artificial Intelligence) system.

The system of the present invention adjusts each main-device parameters (inputs), according to the outputs of the main-device used in the previous phase. The goal is to ensure the integrity of the procedure and of the information by communicating the right parameters to be used.

In difference to fully automated machines, the system of the invention further allows more flexibility by using different accessory-devices (tailored to the right preparation: typically accessory devices for Espresso, Drip coffee, Soluble Coffee, etc.) between the main-devices.

In difference to single serve systems (typically preparing a beverage from a capsule or single-dose container), the system of the invention does not use a single packaging for each preparation, but a multipack, and uses accessory-devices for the extraction/processing.

Figure 1:
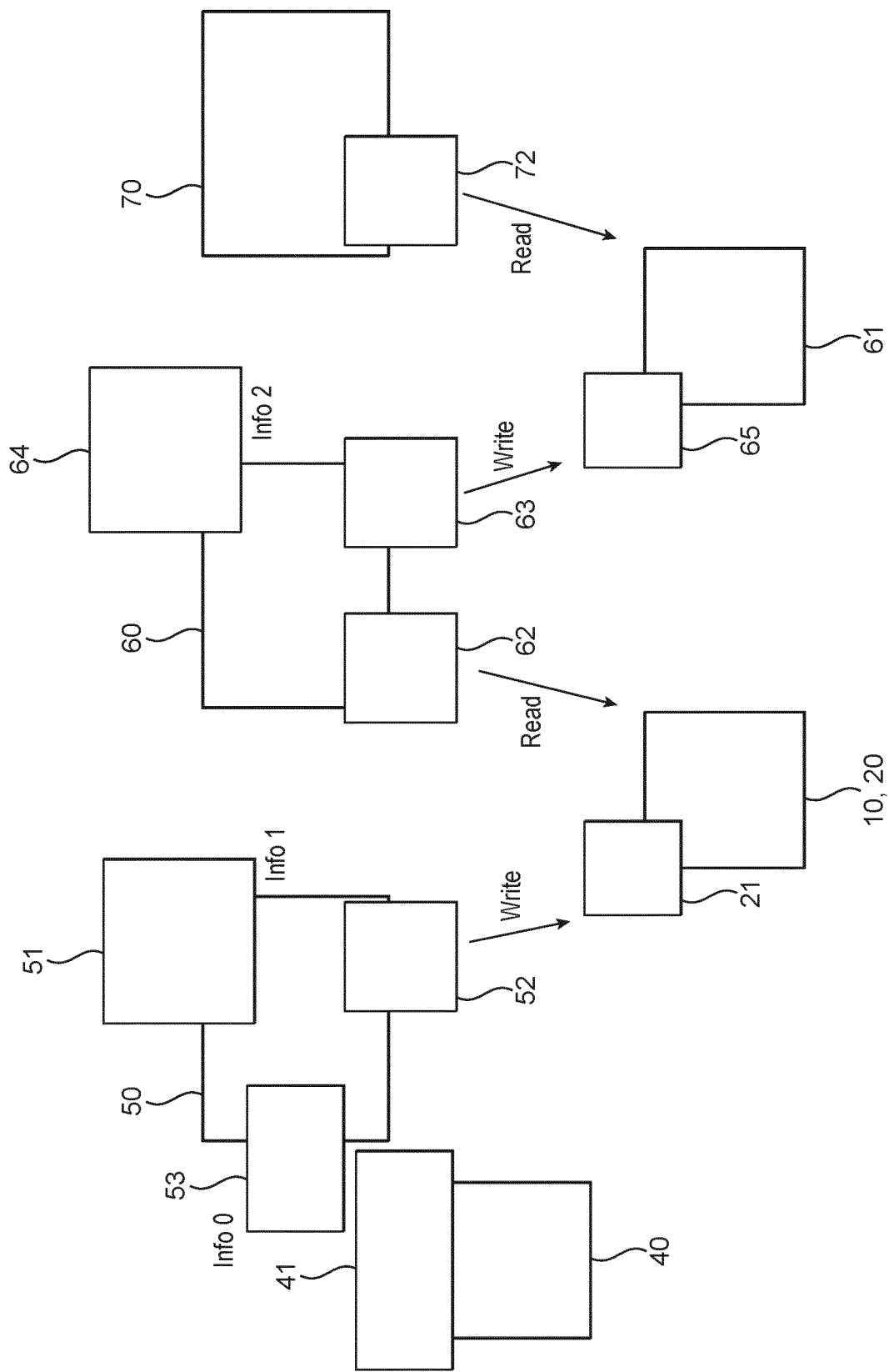

Looking at FIG. 1, it shows a roasting device 50 comprising a reader 53 and an encoder 52. The reader 53 is able to retrieve the information on the identification means 41 of a container 40 comprising coffee beans: these coffee beans can be green or partially roasted or a mixture of the two. The identification means 41 comprise the Information 0 of the coffee beans in the container 40, as represented schematically in FIG. 1. This Information 0 can comprise one or a plurality of the following information: coffee beans type, coffee beans origin, batch volume, recommended roasting level, date of expiration, etc. The identification means 41 in the container 40 can be optical (barcode, QR code, OID) or electromagnetically readable codes (typically, a RFID code). The roasting device 50 further comprises a control unit configuring the roasting profile of the beans according to the characteristics retrieved from the reading means 53 and/or from the characteristics of the beans in a database 51 in this control unit and/or according to the user's input. The roasting device 50 therefore makes the roasting of the green beans, partially roasted beans or the mixture of the two based on this information, and then delivers the roasted coffee beans into a beans container 10, 20. The beans container 10, 20 comprises programmable identification means 21 where product parameters of the roasted coffee beans of a certain type are encoded on it by an encoder 52 in the roasting device. The information encoded on the beans containers 10, 20 is named as Information 1 in the schematic diagram of FIG. 1, and this Information 1 comprises one or a plurality of the following information: Information 0 as explained above and roasting level, date of roasting, coffee origin, roasting profile, roasting date, etc.

The system of the invention further comprises a grinding device 60 comprising one or more housings for receiving one or more beans containers 10, 20. The grinding device 60 comprises a reader 62 to obtain the information of the product parameters (Information 1) of the roasted coffee beans of the one or more beans containers 10, 20. The grinding device 60 further comprises a control unit configured to adapt the grinding size and the quantity of roasted coffee beans to be delivered from the coffee beans containers 10, 20 for obtaining a certain coffee quantity and/or a certain coffee blend quantity from each beans container to be grinded according to these product parameters (Information 1) and/or according to a recipes database 64, and/or according to the user's input.

The grinded coffee is delivered from the grinding device 60 into a product holder 61: this product holder 61 comprises programmable identification means 65, where the encoder 63 in the grinding device 60 can encode the beverage information (called Information 2). This information will comprise one or a plurality of the following: beverage type, volume of the beverage to prepare, beverage temperature, pump profile, etc. The product holder 61 comprising the beverage information (Information 2) with the grinded coffee, will then be transferred to a preparation or extraction device 70, where the final beverage (the coffee beverage) will be prepared and delivered into a cup. The preparation device 70 comprises reading means 72 able to retrieve the beverage information (Information 2) from the identification means 65 in the product holder 61 and therefore make the beverage preparation (beverage extraction) according to this information.

Figure 2:
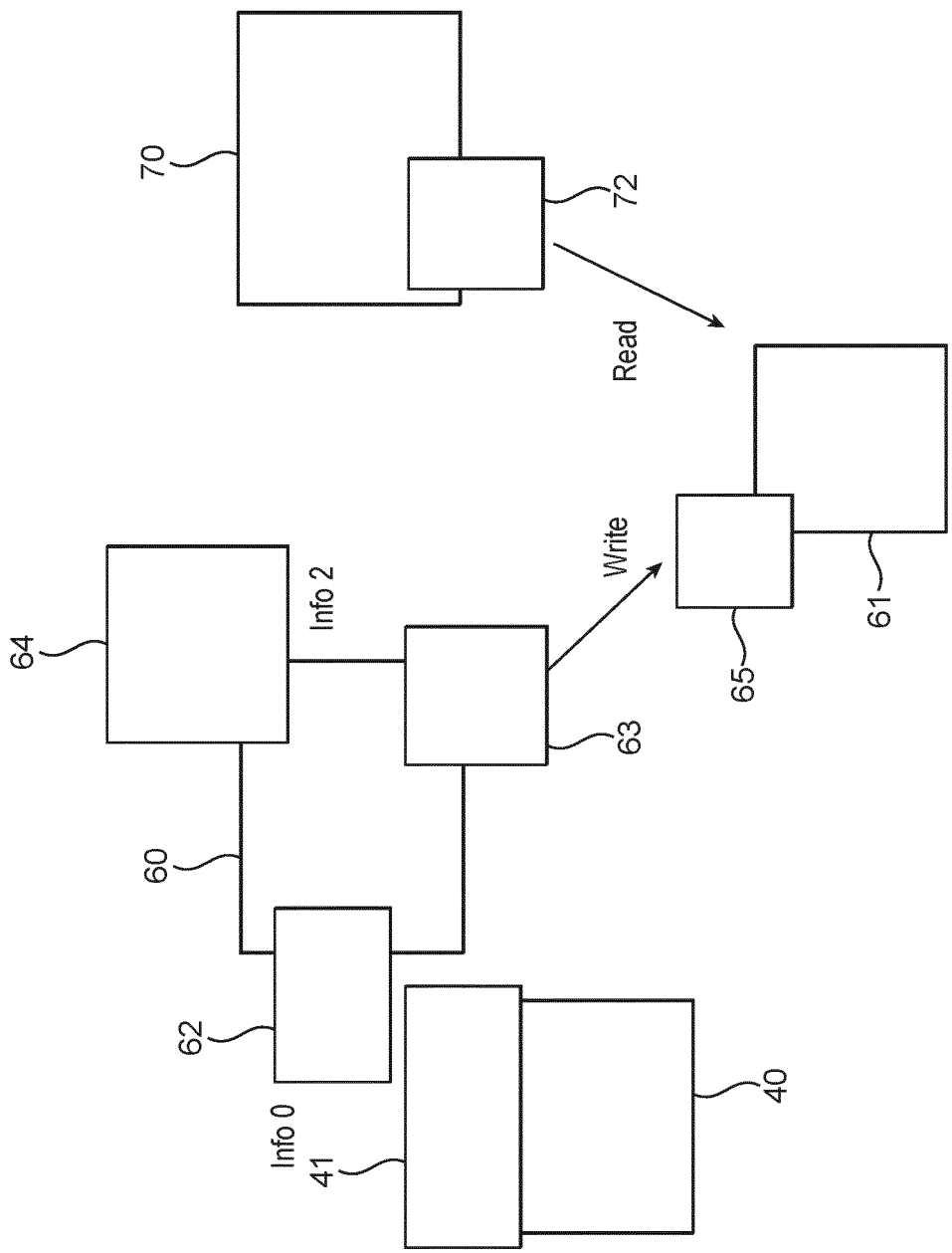
FIG. 2 is an exemplary functional diagram of a dosing, extraction system according to an embodiment of the invention.

Looking now at FIG. 2, an embodiment of the system of the invention is shown, particularly referring to a food product comprised in container 40 in the form of a powder. Similarly, the container 40 will be provided with identification means 41, optical (barcode, QR code, OID) or electromagnetically readable codes (typically, a RFID code) comprising the product information (Information 0 of the product type, such as coffee or milk, etc, and the date of expiration, for example). The system will comprise a dispensing device (60) comprising a reader 62 to retrieve the information on the product from the container 40 and therefore make the dosing according to this information (Information 0). The dispensing device 60 can also be a grinding device, as explained in the previous Figure. According to a preferred embodiment, the powdered product will be comprised in a container 10, 20. The dispensing device 60 further comprises a control unit configured to dispense a certain amount of powdered food or beverage product from a container (either 40 or 10, 20) according to these product parameters (Information 0) and/or according to a recipes database 64 as a function of the beverage to be prepared. The dispensing device 60 further comprises an encoder 63 to encode the beverage information (Information 2) on programmable identification means 65 on a product holder 61 in the dispensing device 60, to where the dispensed powdered food or beverage product is sent. Similarly as to the embodiment described in FIG. 1, the product holder 61 will be transferable into an extraction or preparation device 70 to prepare and dispense the final food or beverage product. The preparation device 70 will comprise a reader 72 to retrieve the beverage information (Information 2) from the identification means 65 in the product holder 61, and prepare the beverage accordingly. This Information 2 will comprise one or a plurality of the following: beverage type, volume of the beverage to prepare, beverage temperature, pump profile, etc.

Figure 3:
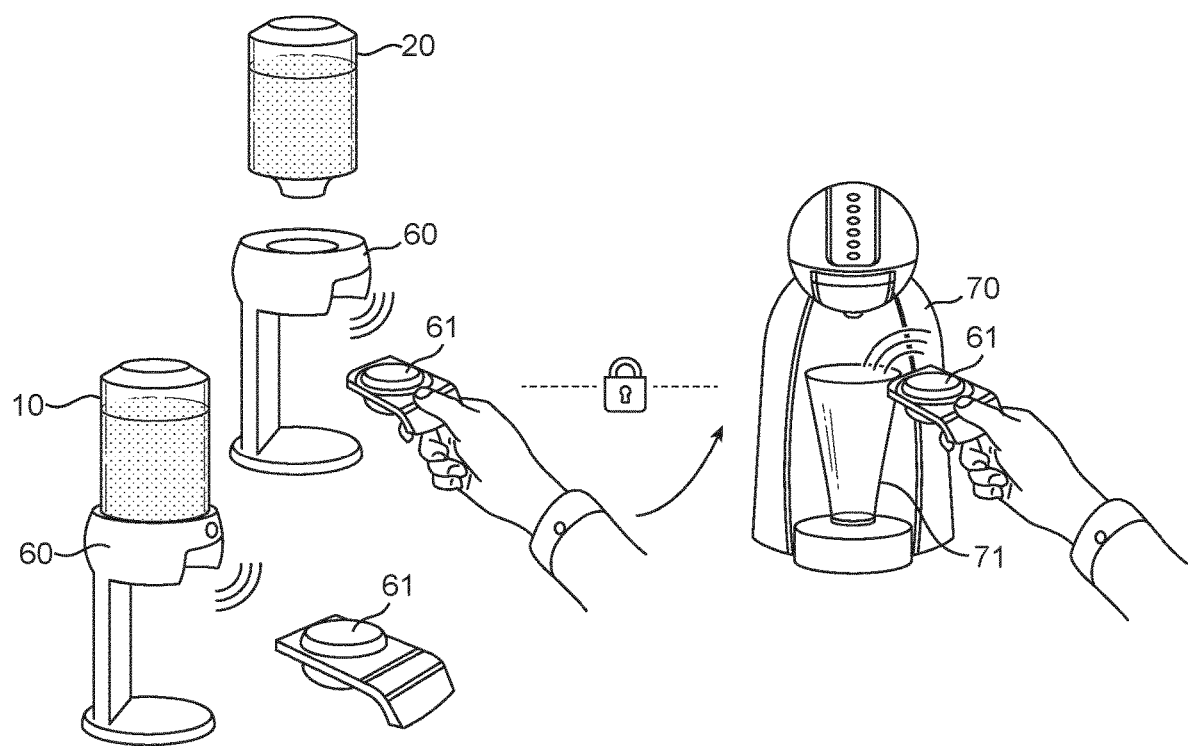
FIG. 3 is a schematic view of a dispensing, extraction system according to an embodiment of the invention.

The embodiment represented functionally in FIG. 2 is shown schematically in FIG. 3: a dispensing device 60 receives a certain product container 10 comprising a certain type of a powder product (milk in powder, for example). The dosing device 60 reads the identification means in this container 10 and so retrieves the product information, therefore knowing which amount of milk powder has to be delivered into the product holder 61 for a certain beverage to be prepared (according to the user's input and/or to the information retrieved in a recipes database 64). A container 20 with another type of powdered product (coffee, for example) is plugged into the dosing device 60. The dosing device will read the information on this product and will deliver the amount needed on the product holder 61 for the beverage to be prepared (according to the user's input and/or to the information retrieved in a recipes database 64). The encoder 63 in the dosing device 60 will then encode the beverage information (Information 2) on the product holder 61 according to the user's input and/or to a recipes database 64. When the product holder 61 will be plugged in a preparation device 70, for the beverage preparation, the Information 2 for the certain beverage extraction will be retrieved by the device 70 so the preparation will be done according to certain parameters.

Figure 4:
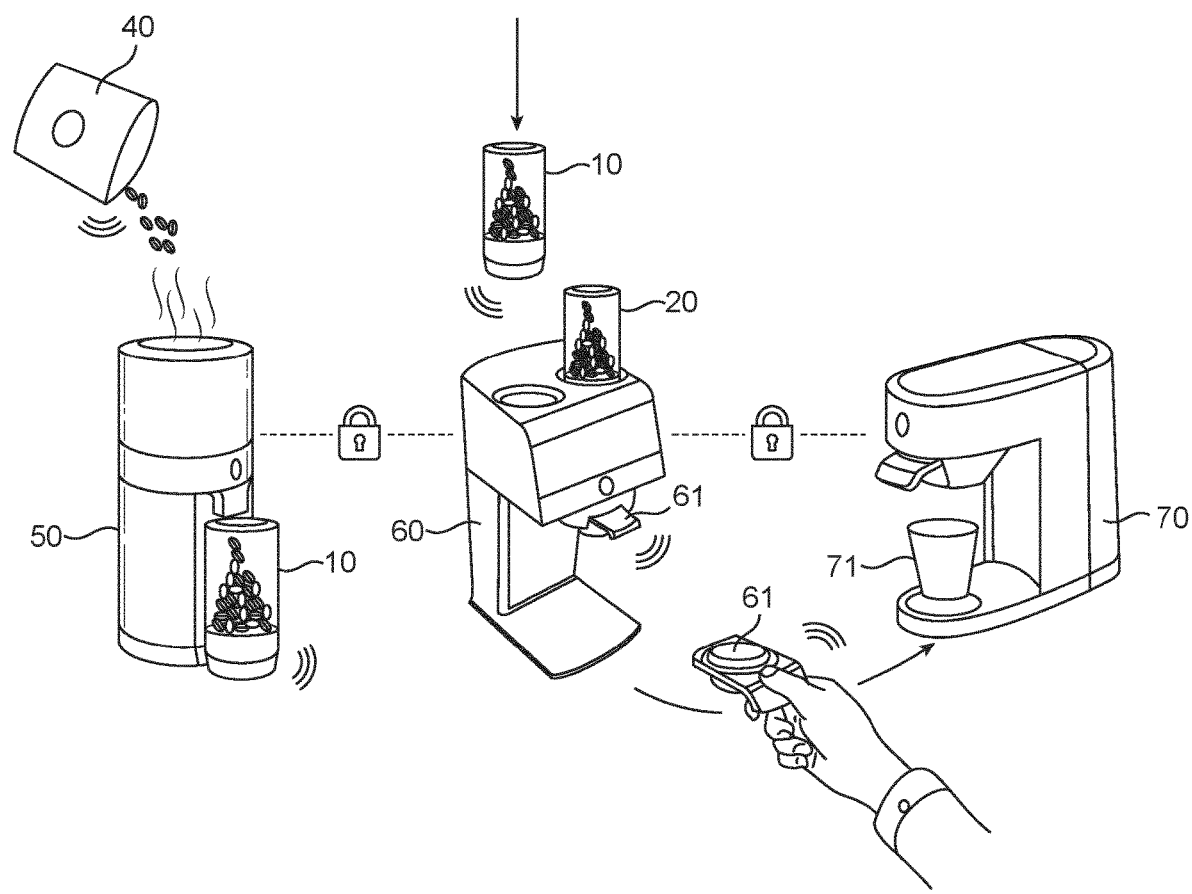
FIG. 4 is a schematic view of a roasting, grinding, extraction system according to an embodiment of the invention.

The functional diagram in FIG. 1 is represented schematically in FIG. 4. A container 40 with coffee beans (green and/or partially roasted) dispenses the beans into a roasting device 50. The Information 0 is read by the roasting device 50 so the roasting takes place according to certain parameters. The roasted coffee beans are delivered in a container 10. Similarly, a different type of coffee beans can be roasted in the roasting device 50 according to different parameters and can be delivered in a container 20. The containers 10, 20 can be plugged into a grinding device 60 where a certain amount of each one of the roasted beans from each of the containers 10, 20 can be sent into a product holder 61. This product holder 61 will be encoded with the beverage information (Information 2) so, when transferred into a dispensing or extraction device 70, the beverage preparation will take place according to certain parameters. The final beverage will be delivered into a cup 71, for example.

Figure 5:
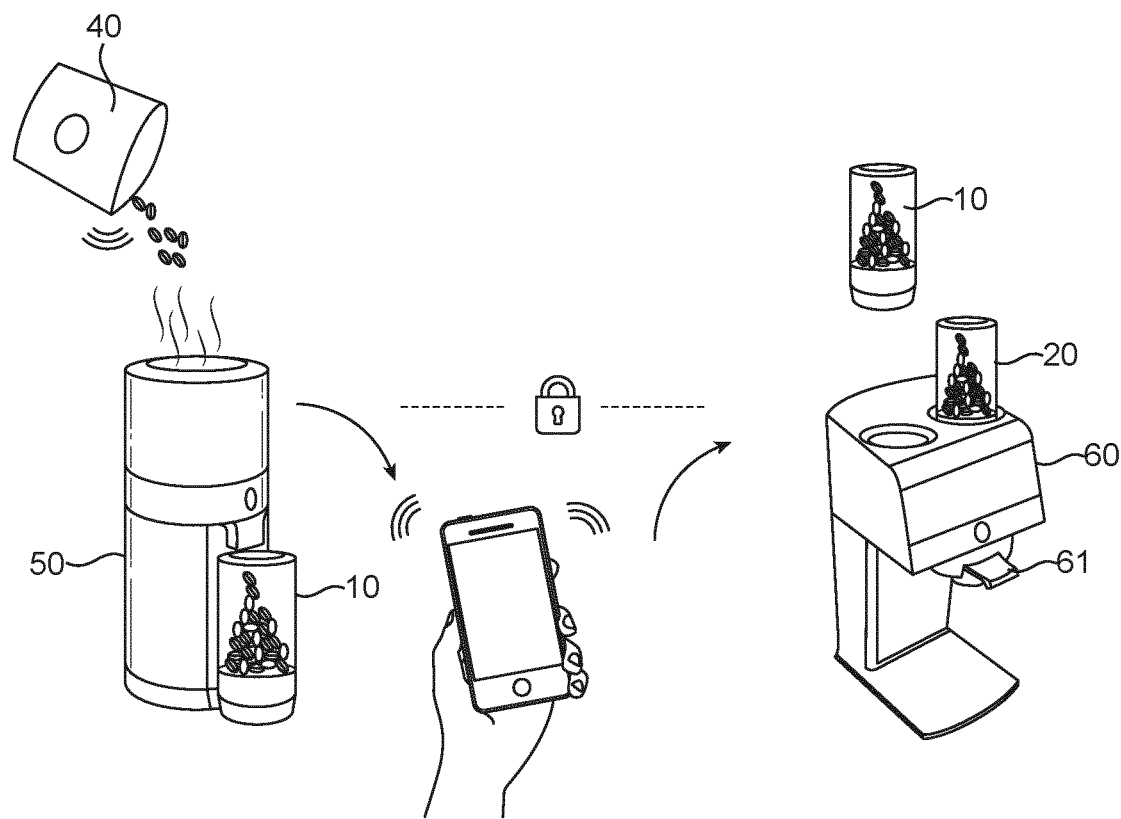
FIG. 5 is a schematic view of a roasting, grinding system according to an embodiment of the invention.

Still another embodiment of the system of the invention is represented in FIG. 5. The roasting device 50 is configured for receiving coffee beans of a certain type from a container 40: these beans will be roasted. The roasting device 50 comprises reading means 53 to identify the characteristics of the coffee beans dispensed to it, and further comprises a control unit configuring the roasting profile of the beans according to the characteristics retrieved from the reading means and/or from the characteristics of the beans in a database in this control unit and/or according to the user input. The roasted coffee beans are sent into a container 10 and are then transferred into a processing device 60. The processing device 60 can be a grinding device where the beans will be grinded (also another certain amount from a different container 20), sent to a product holder 61 that will then be transferred into a beverage preparation device 70 for the final beverage dispensing, or the processing device (not shown) can be a grinding device and a preparation or extraction device (functionalities of the device 60 and 70 together).

The roasting device 50 comprises a data transfer function to communicate product parameters of the roasted coffee beans of a certain type to the coffee processing device (grinding device or grinding and extraction device).

Figure 6:
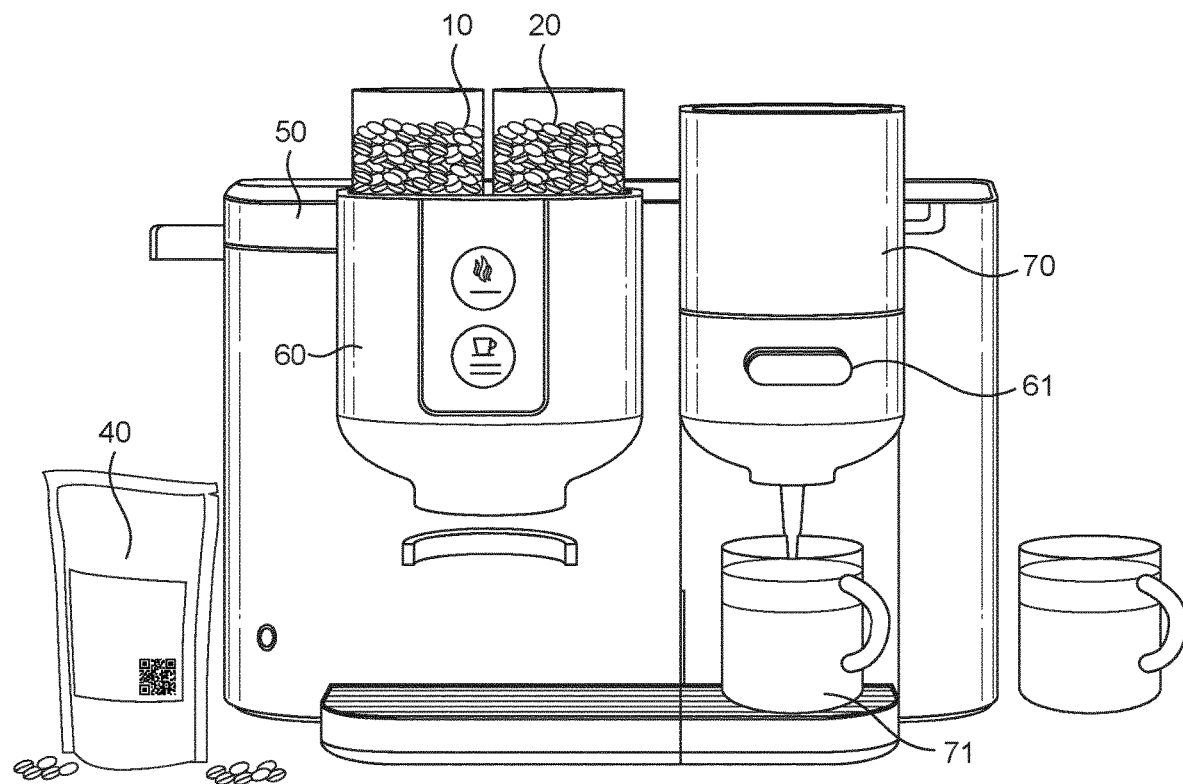
FIG. 6 is a schematic representative view of a roasting, grinding, extraction system according to an embodiment of the invention.

An schematic representation of the system of the invention is shown in FIG. 6. The container 40 comprises coffee beans (green and/or partially roasted) that will be roasted in the device 50 and sent into containers 10, 20 for different types of coffee beans. The containers 10, 20 will be plugged in a grinding device 60 to deliver a certain blend into a product holder 61 that, when plugged in a preparation device 70, will deliver the coffee beverage into a cup 71.

Figure 7:
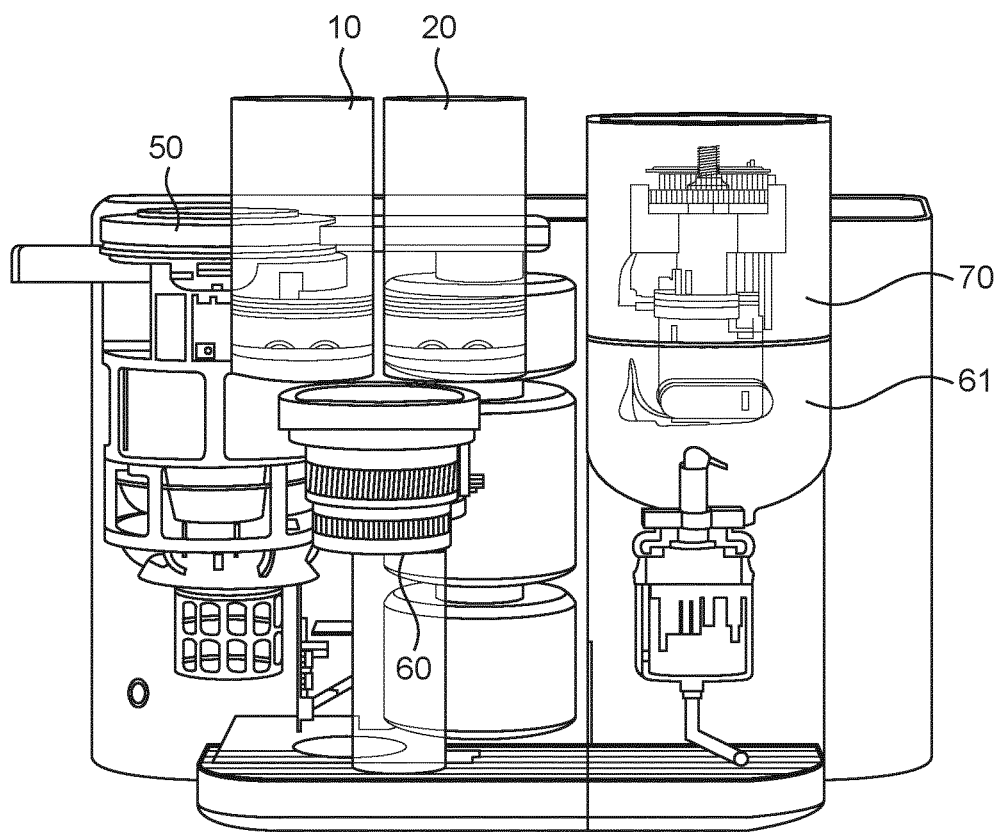
FIG. 7 is a schematic representative view of a roasting, grinding, extraction system according to an embodiment of the invention, showing the different elements belonging to it.

FIG. 7 represents the main components and connections of the system represented in FIG. 6, namely the roasting device 50, the containers 10, 20, the dispensing or grinding device 60 and the preparation or extraction device 70.

Figure 8:
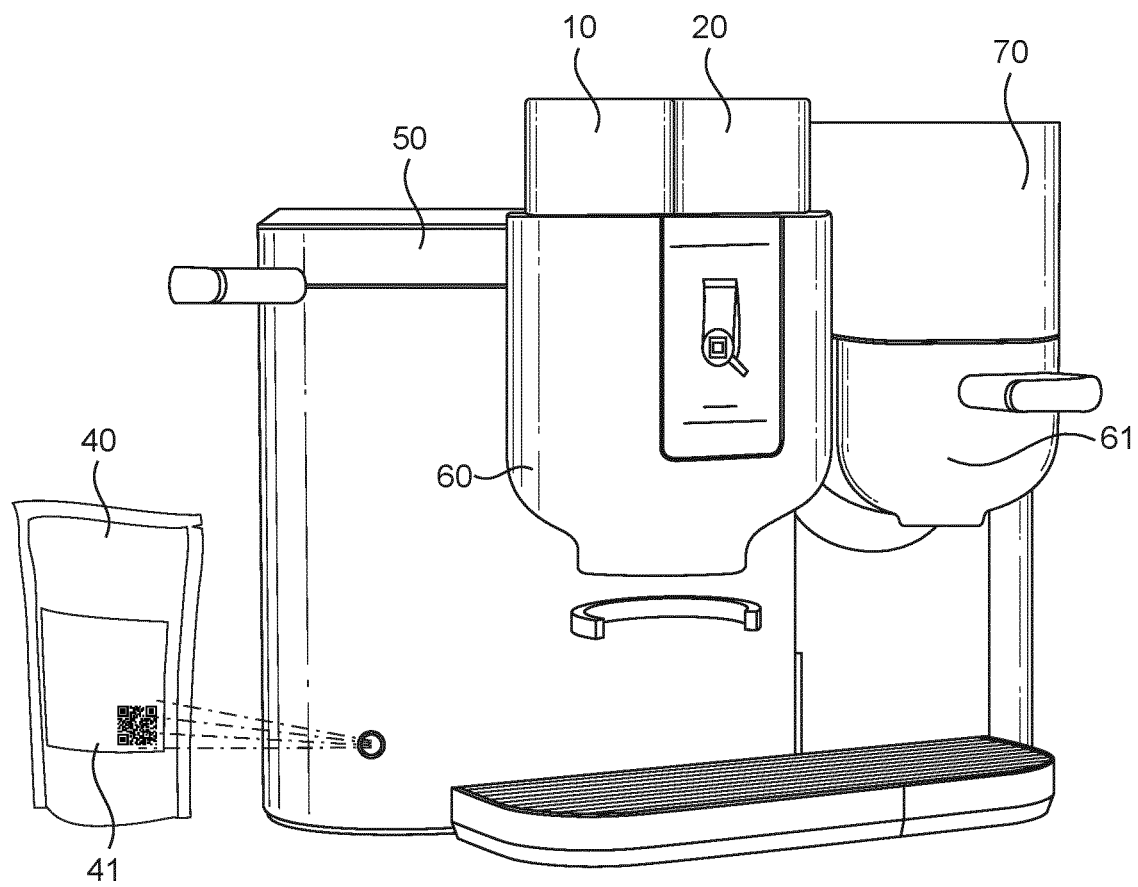
FIG. 8 is a schematic representative view of the roasting, grinding, extraction system in FIG. 7, showing the reading of identification means in the container comprising the coffee beans.

FIG. 8 shows the identification means 41 in the container 40 comprising the coffee beans. These identification means 41 will comprise the information on the coffee beans type and/or origin and/or the batch volume and/or date of expiration and/or recommended roasting level, amongst other information. The reading means 53 in the roasting device 50 will retrieve this information and will consequently do the roasting according to certain parameters.

Figure 9:
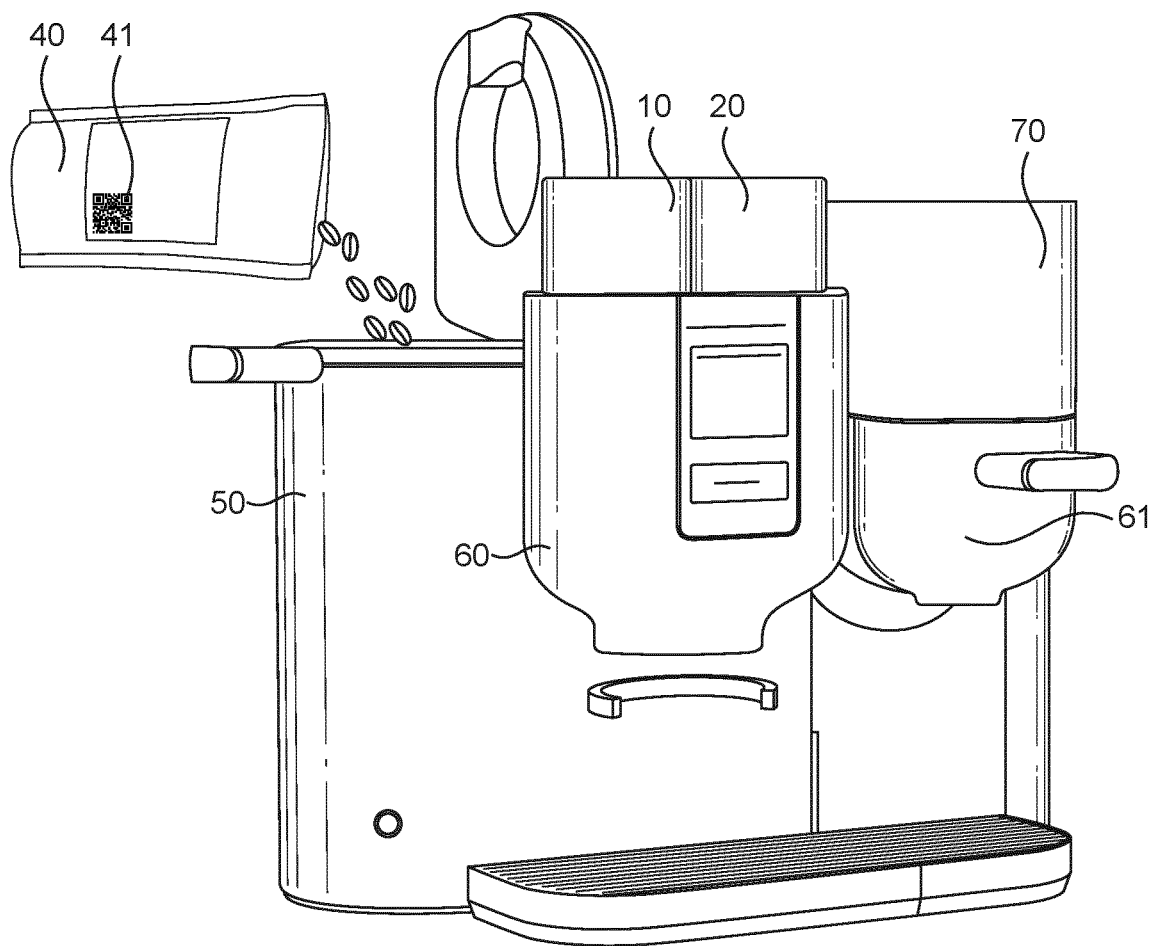
FIG. 9 is a schematic representative view of the roasting, grinding, extraction system in FIG. 7, showing the delivery of the coffee beans into the roasting device.
Figure 10:
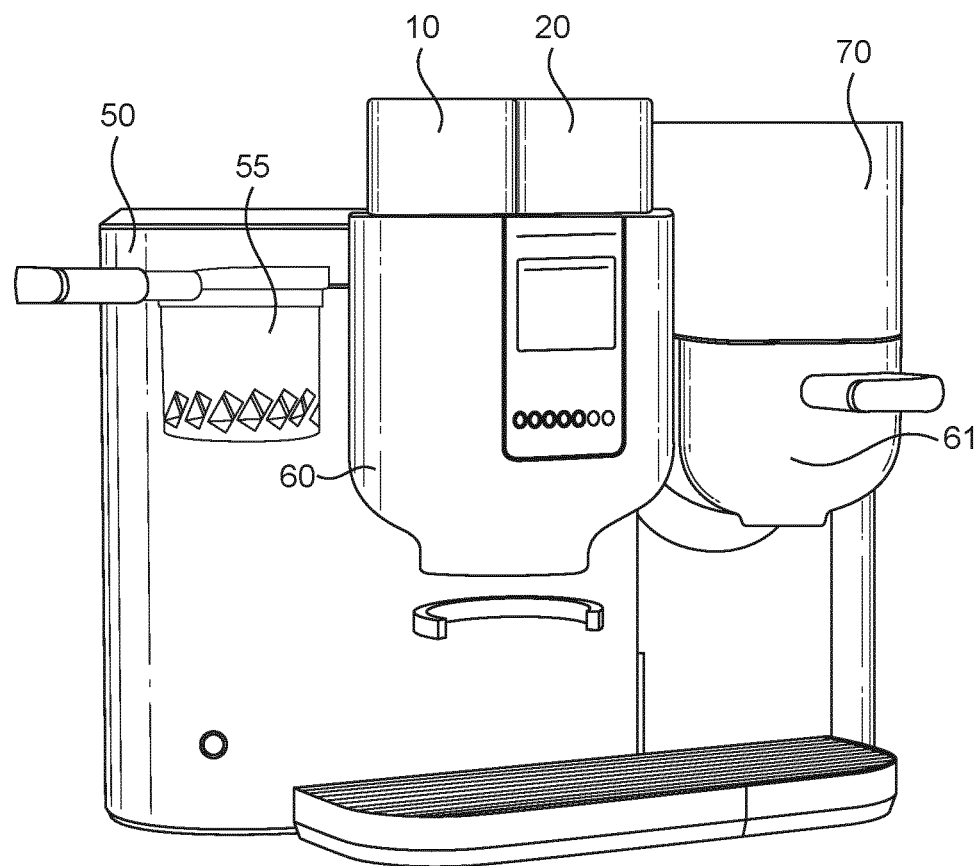
FIG. 10 is a schematic representative view of the roasting, grinding, extraction system in FIG. 7, showing the process of roasting the coffee beans in the roasting device.

FIG. 9 shows the beans from the container 40 being delivered into the roasting device 50 for being roasted, before being sent to one of the containers 10, 20 and then to the grinding device 60. FIG. 10 shows the roasting step of the beans (green and/or partially roasted) in the roasting device 50.

Figure 11:
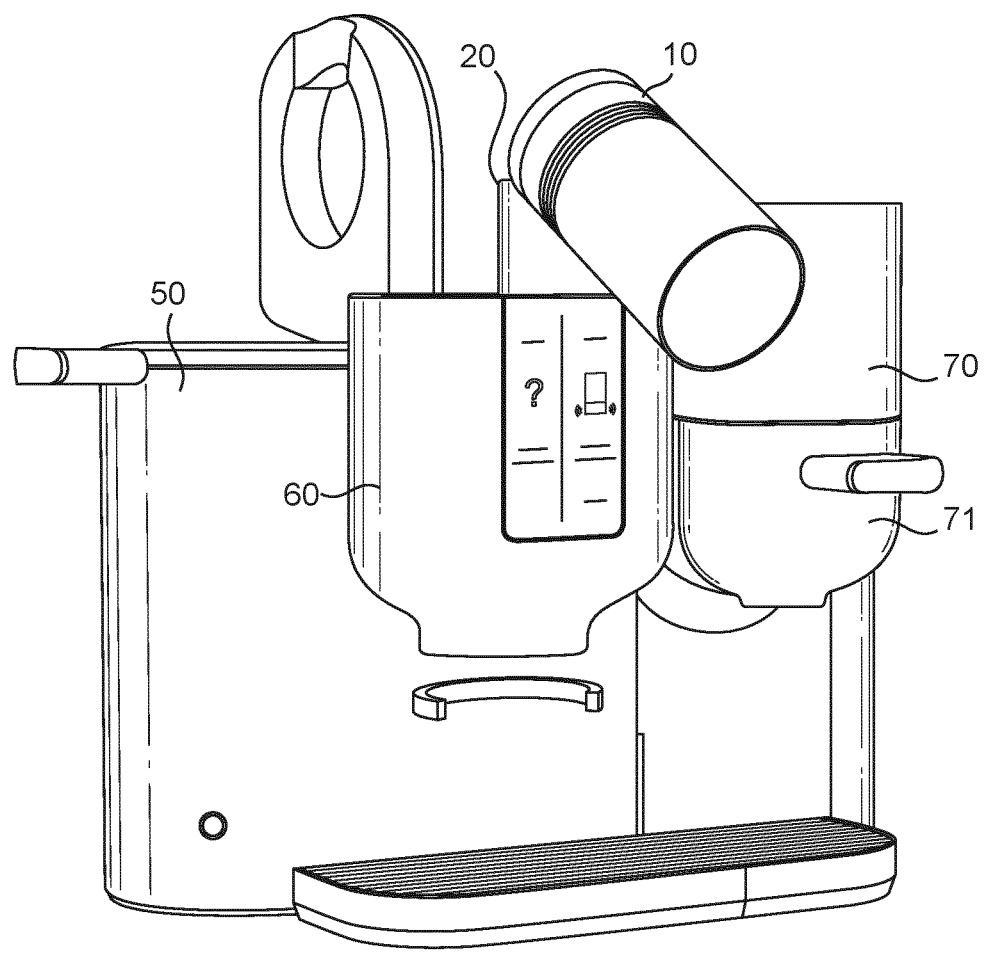
FIG. 11 is a schematic representative view of the roasting, grinding, extraction system in FIG. 7, showing the plugging of a container in the grinding or dispensing device.
Figure 12:
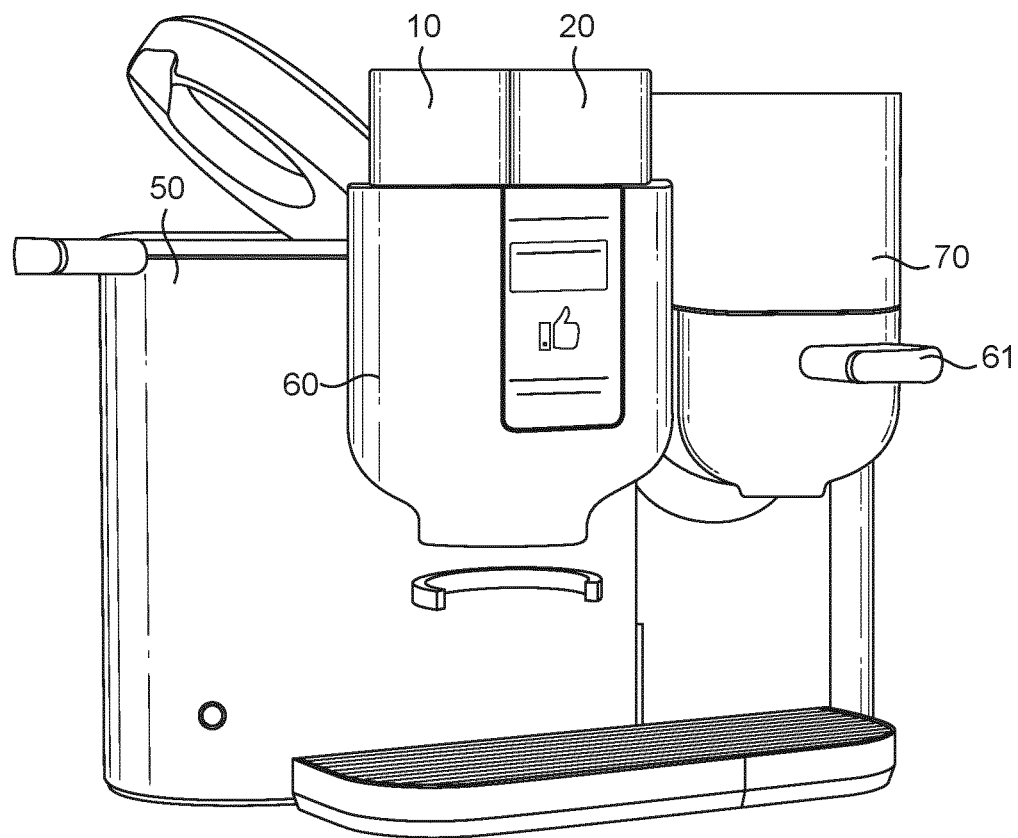
FIG. 12 is a schematic representative view of the roasting, grinding, extraction system in FIG. 7, showing two containers plugged in the grinding or dispensing device.
Figure 13:
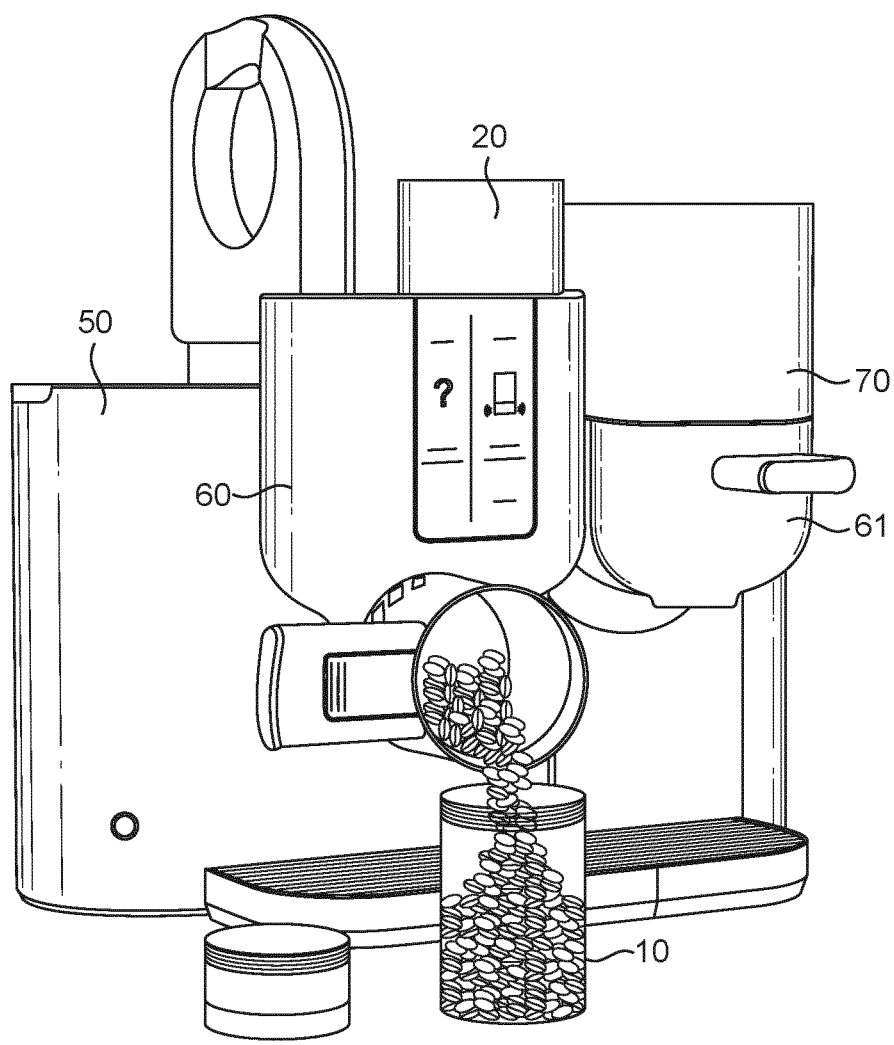
FIG. 13 is a schematic representative view of the roasting, grinding, extraction system in FIG. 7, showing the reading of identification means in the container comprising the coffee beans.
Figure 14:
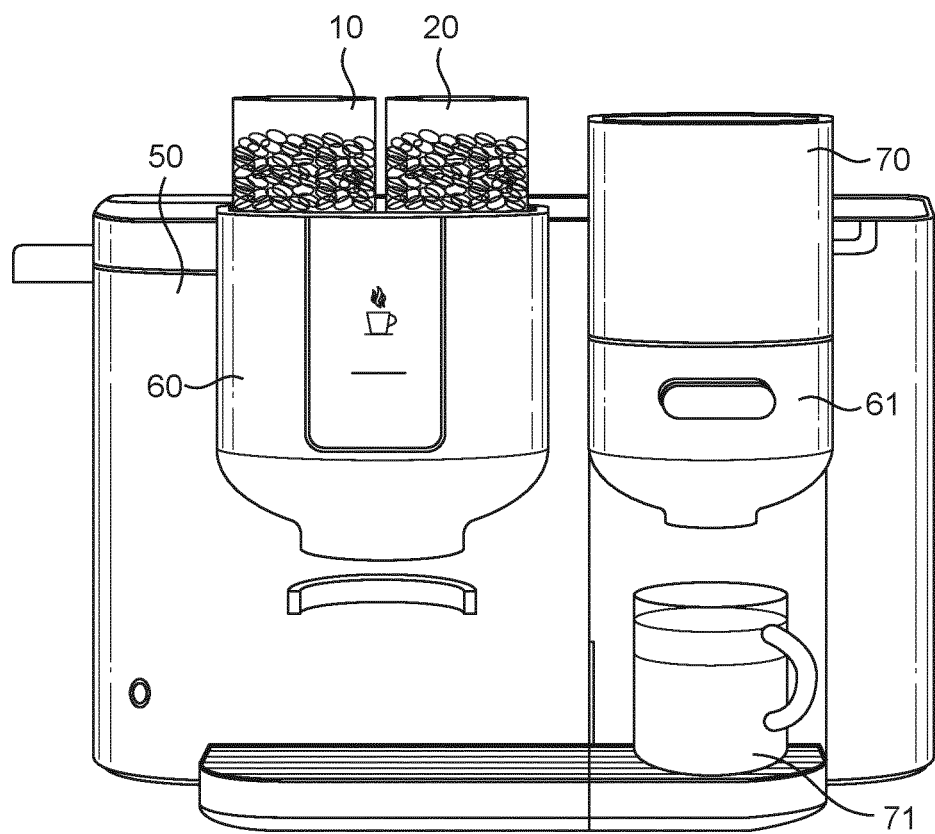
FIG. 14 is a schematic representative view of the roasting, grinding, extraction system in FIG. 7, showing the beverage finally dispensed in a cup.

The roasting device 50 opens (FIG. 12) and one of the containers 10 or 20 plugged in the grinding device 60 is unplugged from it (FIG. 11) so it can receive the roasted beans coming from the roasting device 50 (FIG. 13). Typically, the roasting device 50 will comprise a removable basket to where the unroasted and/or partially roasted beans are delivered from the container 40 and where they are later roasted. The basket will be able to be removed from the roasting device 50 and then the roasted beans can be sent into a container 10 or 20 that will be later plugged into a grinding device 60 (FIG. 14).

Figure 15:
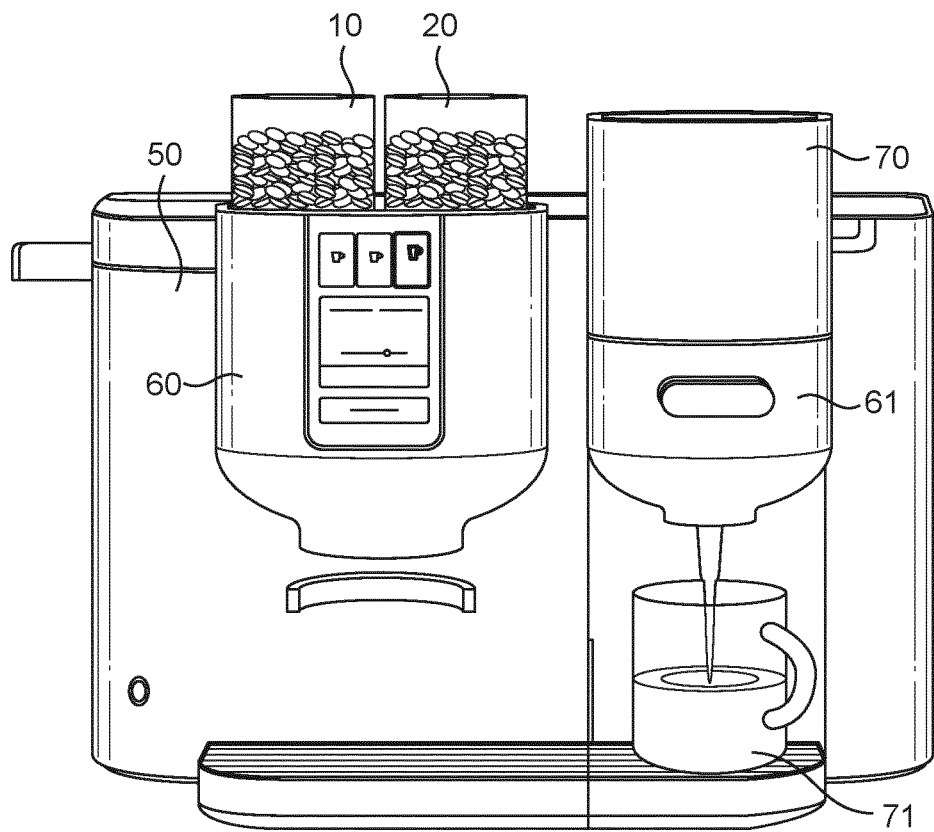
FIG. 15 is a schematic representative view of the roasting, grinding, extraction system in FIG. 7, showing the dispensing of the beverage in a cup.
Figure 16:
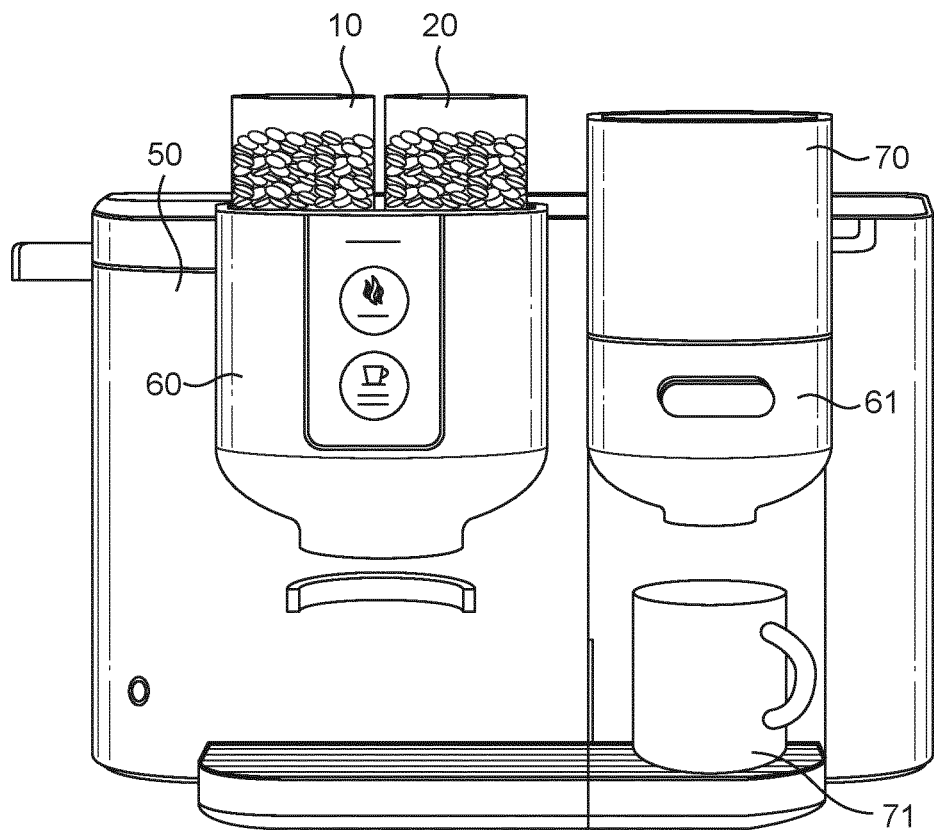
FIG. 16 is a schematic representative view of the roasting, grinding, extraction system in FIG. 7, showing the system prepared for dispensing a beverage.
Figure 17:
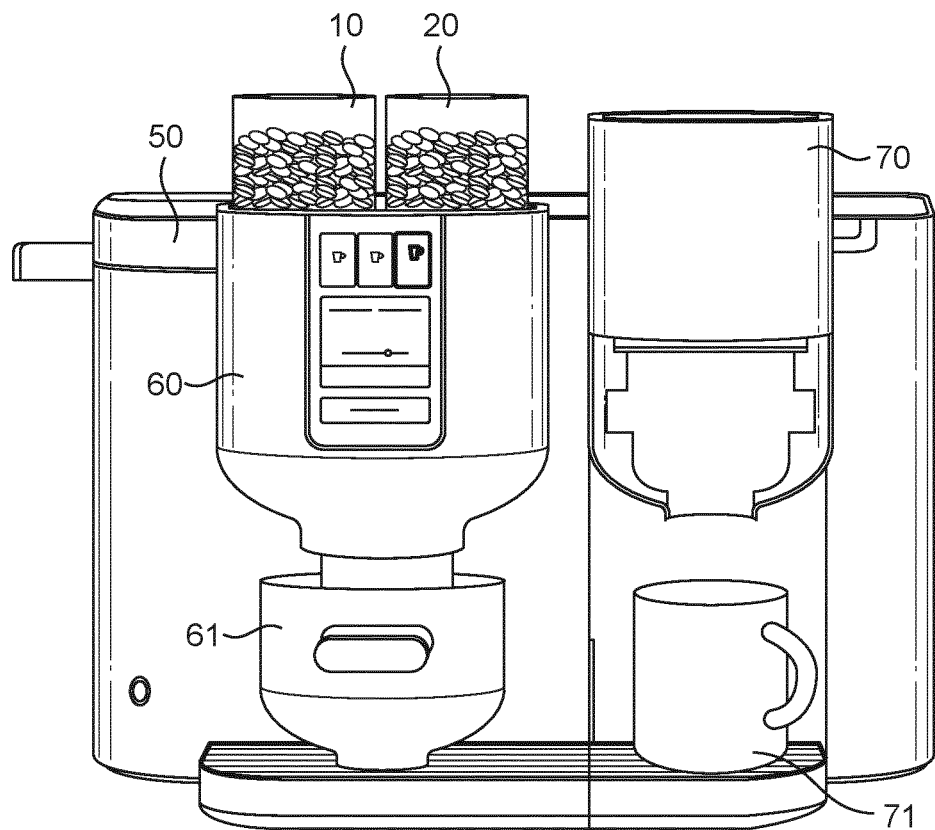
FIG. 17 is a schematic representative view of the roasting, grinding, extraction system in FIG. 7, showing the dispensing of grinded coffee for the further preparation of a beverage.
Figure 18:
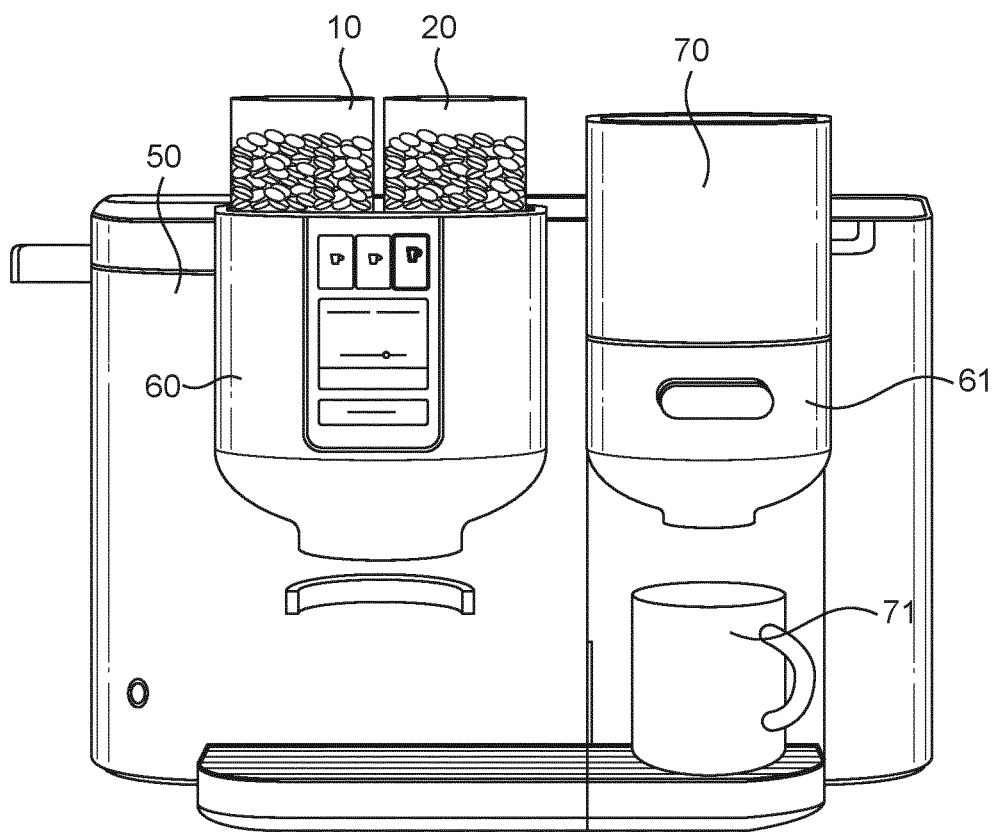
FIG. 18 is a schematic representative view of the roasting, grinding, extraction system in FIG. 17, showing the grinded coffee arranged in the preparation device, ready to prepare a beverage.

FIG. 16 shows schematically the roasting step in the system of the invention. Once the roasting is finished, grinding takes place (FIG. 18) and the grinded coffee (coffee blend) is sent into a product holder 61 (FIG. 17) that will be then plugged into a preparation or extraction device 70: the beverage preparation in the preparation or extraction device 70 and its delivery into a cup 71 is sown in FIG. 15.

Figure 19:
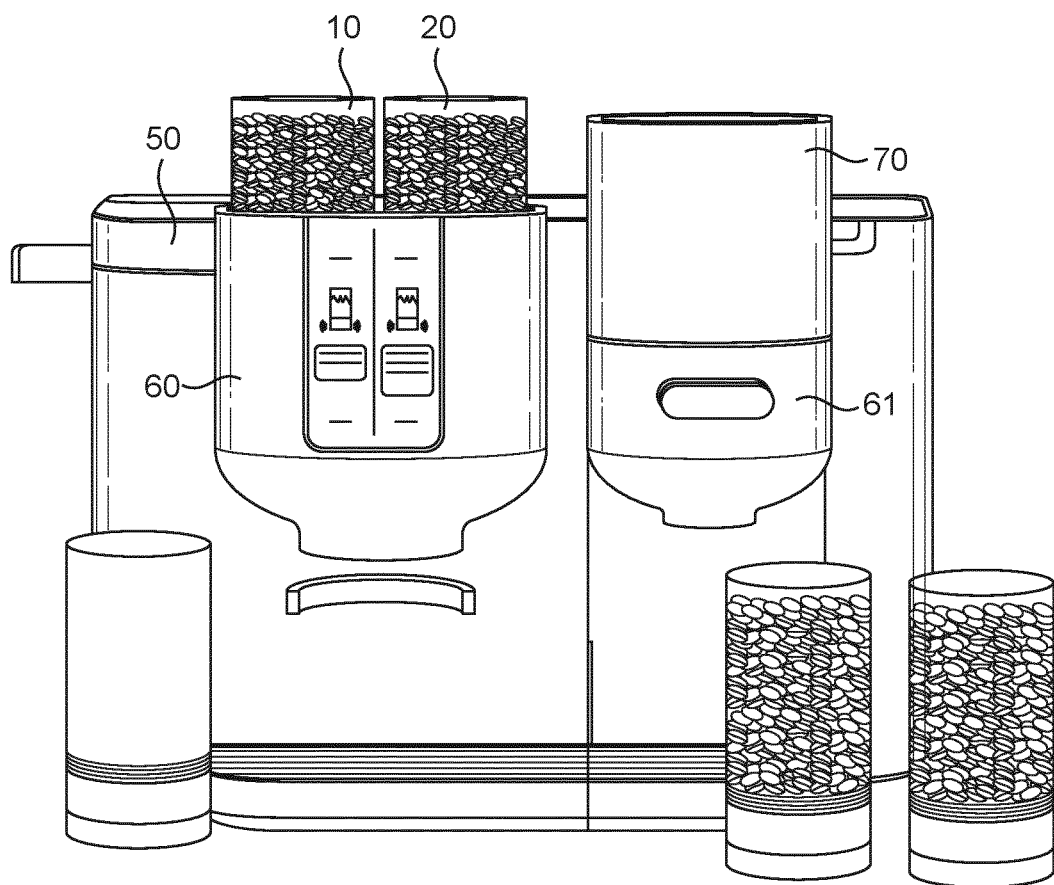
FIG. 19 is a schematic representative view of the roasting, grinding, extraction system in FIG. 7, showing the possibility of plugging in the grinding device several containers comprising different types of coffee beans.
Figure 20:
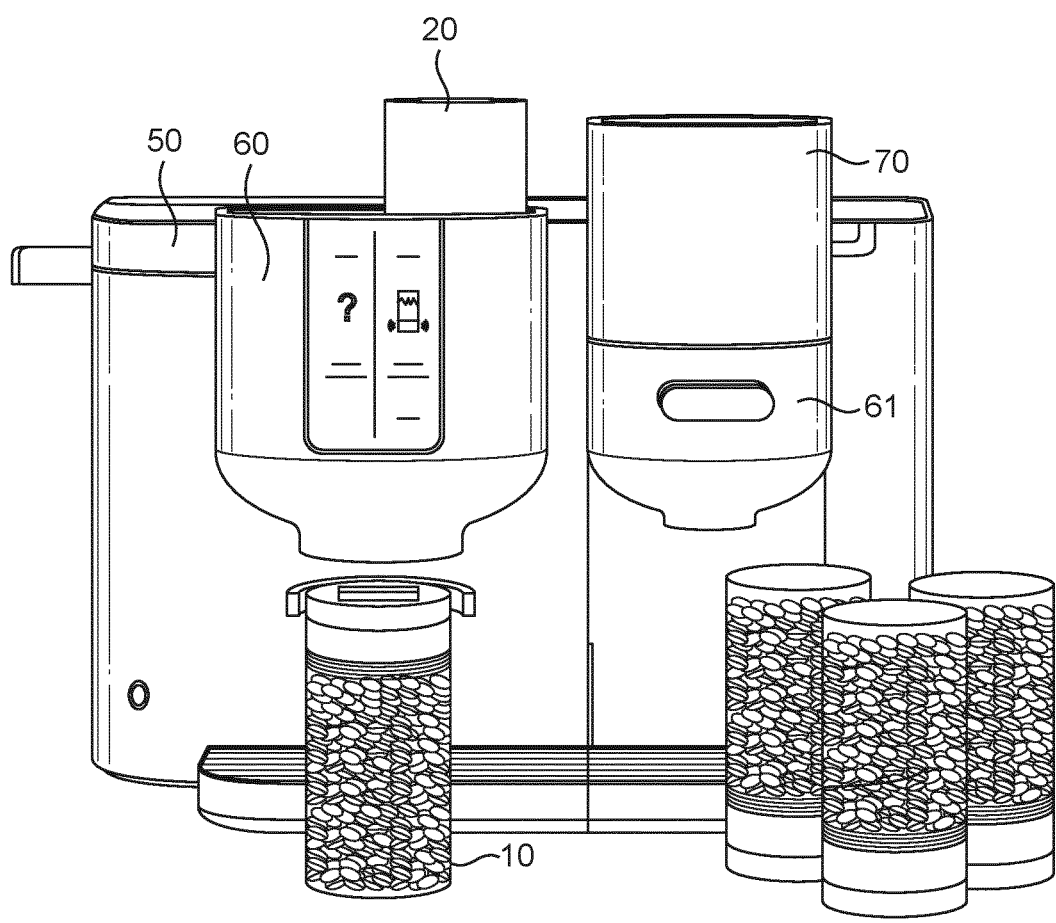
FIG. 20 is a schematic representative view of the roasting, grinding, extraction system in FIG. 7, showing different containers comprising different types of coffee beans that can be plugged in the grinding device in order to obtain different coffee blends.

FIGS. 19 and 20 show schematically different types of coffee beans that can be in different containers 10, 20 so different coffee blends can be prepared. The system of the invention allows a high versatility and the containers 10, 20 can be quickly plugged and unplugged in the grinding or dispensing device 60 (plug and play type system).

According to a second object, the invention relates to a method for roasting and grinding coffee beans using a roasting and grinding apparatus as the one described.

According to a third object, the invention further relates to the use of a roasting and grinding apparatus as the one described for delivering a blend of roasted and grinded coffee beans in a certain quantity.

It should be clear to a skilled person that the embodiments shown in the figures are only preferred embodiments, but that, however, also other designs of a system can be used.

The invention claimed is:

1. A grinding and extraction system for roasted coffee beans comprising a grinding device and an associated extraction device;
   the grinding device comprising:
      one or more housings configured to receive one or more beans containers with roasted coffee beans of the same or different types,
      a first reader configured to obtain product parameters of the roasted coffee beans from the one or more beans containers,
      a control unit configured to adapt the grinding size and the quantity of roasted coffee beans to obtain a quantity of roasted coffee beans from the one or more beans containers and to cause the grinding device to grind the roasted coffee beans according to these product parameters and/or according to a recipes database comprising the beverage information associated to the beverage to be prepared, and
      an encoder configured to encode the product parameters on a programmable identification member on a product holder in the grinding device to which the grinded coffee is dispensed; and
   the extraction device being configured to receive the product holder, the extraction device comprising:
      a second reader to identify the product parameters in the programmable identification member, and
      a control unit configured to cause the extraction device to extract the beverage according to the product parameters retrieved from the product holder and/or beverage information retrieved from a beverage database in this control unit.

2. The system of claim 1, wherein the beverage information comprises data selected from the group consisting of: beverage type, beverage volume, brewing temperature, brewing pump profile, and brewing profile according to time.

3. The system of claim 1, wherein the product parameters are selected from the group consisting of: coffee beans type, coffee beans origin, batch volume, recommended roasting level or levels, date of harvest, date of production, production data, farmer data, date of expiration, company and marketing info.

4. The system of claim 1, wherein the product holder comprises a plugging member to be plugged and/or unplugged onto the grinding device and onto the extraction device so that the product holder is freely exchangeable.

5. The system of claim 1, wherein the product holder is configured to be locked on the grinding device and on the extraction device to allow the product holder to be fixed during the grinding and the extraction operations, respectively.

6. The system of claim 1, wherein the quantity of coffee to be grinded, the grinding size and the blend in the grinding device are adapted as a function of the type of beverage to be prepared from the roasted and grinded coffee beans in combination with the product parameters of the roasted coffee beans of the one or more beans containers connected to the grinding device.

7. The system of claim 1 wherein the one or more beans containers have an embedded dosing device to dose only the needed quantity of roasted coffee beans in the grinding device.

8. The system of claim 7 wherein the grinding device comprises a motor and a drive to control the embedded dosing device of the one or more beans containers to dose only the needed dose of roasted coffee beans to the grinding device.

9. The system of claim 6 wherein the first reader comprises a RFID tag reader to obtain product parameters of the roasted coffee beans of the one or more beans containers connected to the grinding device.

10. A method for grinding roasted coffee beans and preparing a beverage from them using a grinding and extraction system comprising the following steps:
    reading product parameters in a beans container;
    adapting the grinding size according to the product parameters read and/or according to a recipes database;
    dispensing a quantity of roasted coffee beans from the beans container in a grinding device;
    carrying out the grinding as to grinding size and quantity according to the product parameters and/or according to the recipes database;
    encoding the product parameters on a product holder using an encoder in the grinding device;
    transferring the product holder to an extraction device manually or automatically;
    reading the product parameters from the product holder using the extraction device and extracting the beverage according to the product parameters and/or from beverage information retrieved from a beverage database.

11. The method of claim 10 where a certain coffee blend is produced in the grinding device and put in the product holder, the method comprising the following further steps:
    attaching a plurality of beans containers into the grinding device at the same time;
    reading the product parameters in each of the plurality of the beans containers; and
    carrying out the grinding as to grinding size and quantity of each of the beans containers according to the product parameters read for each and to the type of beverage to be prepared from the recipes database from the roasted and grinded coffee beans.

* * * * *